United States Patent
Aweya et al.

(10) Patent No.: US 6,990,070 B1
(45) Date of Patent: Jan. 24, 2006

(54) METHOD AND APPARATUS FOR ADJUSTING PACKET TRANSMISSION VOLUME FROM A SOURCE

(75) Inventors: James Aweya, Nepean (CA); Delfin Y. Montuno, Kanata (CA); Michel Quellette, Rockland (CA)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/465,705

(22) Filed: Dec. 17, 1999

(51) Int. Cl.
  *H04J 1/16* (2006.01)

(52) U.S. Cl. ..................................... 370/230; 370/412

(58) Field of Classification Search ................. 370/229, 370/230, 231, 232, 234–237, 351, 389, 412–419, 370/428, 429, 467, 527, 529
See application file for complete search history.

(56) References Cited

U.S. PATENT DOCUMENTS

| | | | |
|---|---|---|---|
| 4,769,815 A | | 9/1988 | Hinch et al. |
| 5,541,919 A | | 7/1996 | Yong et al. |
| 5,546,389 A | * | 8/1996 | Wippenbeck et al. ........ 370/412 |
| 5,737,313 A | * | 4/1998 | Kolarov et al. .............. 370/234 |
| 5,748,901 A | * | 5/1998 | Afek et al. .................. 370/229 |
| 5,781,772 A | | 7/1998 | Wilkinson, III et al. |
| 5,805,585 A | * | 9/1998 | Javitt et al. ................. 370/342 |
| 6,011,795 A | | 1/2000 | Varghese et al. |
| 6,018,524 A | | 1/2000 | Turner et al. |
| 6,067,574 A | | 5/2000 | Tzeng |
| 6,108,307 A | | 8/2000 | McConnell et al. |
| 6,119,235 A | | 9/2000 | Vaid et al. |
| 6,212,184 B1 | | 4/2001 | Venkatachary et al. |

(Continued)

OTHER PUBLICATIONS

Kalampoukas, Lampros; Varma, Anujan; Ramakrishnan, K.K.; "Explicit Window Adaptation: A Method to Enhance TCP Performance", UCSC–97–21, pp. 1–28, Aug. 1997.

Satyavolu, Ramakrishna; Duvedi, Ketan; Kalyanaraman, Shivkumar; "Explicit Rate Control of TCP Applications", ATM Forum Document Number: ATM Forum/98–0152R1, pp. 1–20, Feb. 1998.

Ziegler, T.; Clausen, H.D.; Congestion Avoidance with BUC (Buffer Utilization Control) Gateways and RFCN (Reverse Feedback Congestion Notification).

Elz, R.; "A Compact Representation of IPv6 Addresses", Network Working Group, University of Melbourne, pp. 1–6, Apr. 1, 1996.

Jacobson, Van, Karels Michael J.; "Congestion Avoidance and Control", Proc. ACM SIGCOMM'88, pp. 314–329, Nov., 1988.

Jacobson, Van; "Modified TCP Congestion Avoidance Algorithm", end2end–interest mailing list, Apr. 30, 1990.

Floyd, Sally; Jacobson, Van; "Random Early Detection Gateways for Congestion Avoidance", IEEE/ACM Trans. Networking, vol. 1, No. 4, pp. 297–413, Aug. 1993.

Fall, Kevin; Floyd, Sally; "Simulation–based Comparisons of Tahoe, Reno, and SACK TCP", Computer Commun. Rev. Jul. 1996.

(Continued)

*Primary Examiner*—John Pezzlo
*Assistant Examiner*—David Odland

(57) ABSTRACT

A method and apparatus are provided for adjusting the volume of data communicated between a transmitter and a receiver on a network, in a time interval. The method involves producing a desired volume value in response to a volume value specified by the receiver and a difference between a target departure volume and an estimate of arrival volume of data at a queue through which data passes from the transmitter to the receiver, and communicating the desired volume value to the transmitter in response to an acknowledgement signal produced by the receiver.

33 Claims, 6 Drawing Sheets

U.S. PATENT DOCUMENTS

| | | | |
|---|---|---|---|
| 6,215,769 B1 | | 4/2001 | Ghani et al. |
| 6,219,713 B1 | * | 4/2001 | Ruutu et al. ................. 709/235 |
| 6,223,172 B1 | | 4/2001 | Hunter et al. |
| 6,252,851 B1 | | 6/2001 | Siu et al. |
| 6,266,706 B1 | | 7/2001 | Brodnik et al. |
| 6,324,165 B1 | * | 11/2001 | Fan et al. ................... 370/232 |
| 6,333,917 B1 | | 12/2001 | Lyon et al. |
| 6,424,626 B1 | | 7/2002 | Kidambi et al. |
| 6,463,068 B1 | | 10/2002 | Lin et al. |
| 6,490,251 B2 | | 12/2002 | Yin et al. |
| 6,526,055 B1 | | 2/2003 | Perlman et al. |
| 6,529,477 B1 | | 3/2003 | Toporek et al. |
| 6,549,517 B1 | * | 4/2003 | Aweya et al. ............ 370/236.1 |
| 6,560,610 B1 | | 5/2003 | Eatherton et al. |
| 6,614,789 B1 | | 9/2003 | Yazdani et al. |
| 6,671,258 B1 | | 12/2003 | Bonneau |

OTHER PUBLICATIONS

Mathis, M.; Mahdavi, J.; Floyd, S.; Romanow, A.; "TCP Selective Acknowledgement Options", IETF RFC 2018, pp. 1–12, Oct. 1996.
Mathis, Matthew; Mahdavi, Jamshid; "Forward Acknowledgement: Refining TCP Congestion Control", Proc. ACM SIGCOMM'96, Aug. 1996.
Demers, Alan; Keshav, Srinivasan; Shenker, Scott; "Analysis and Simulation of a Fair Queueing Algorithm", Internetworking: Research and Experience, vol. 1, pp. 1–12, 1989.
Braden, B.; Clark, D.; Crowcroft, J.; Davie, B.; Deering, S.; Estrin, D.; Floyd, S.; Jacobson, V.; Minshall, G.; Partiridge, C.; Peterson, L.; Ramakrishnan, K.; Shenker, S.; Wroclawski, J.; Zhang, L.; "Recommendations on Queue Management and Congestion Avoidance in the Internet", IETF RFC 2309, pp. 1–17, Apr. 1998.
Partridge, C.; "ACK Spacing for High Delay–Bandwidth Paths with Insufficient Buffering", IETF Internet Draft, pp. 1–4, Sep. 1998.
Rijsinghani, A.; "Computation of the Internet Checksum via Incremental Update", IETF RFC 1624, pp. 1–6, May 1994.
Floyd, Sally; Jacobson, Van; "Link–Sharing and Resource Management Models for Packet Networks", IEEE/ACM Trans. Networking, vol. 3, No. 4, pp. 365–386, Aug. 1995.
"Traffic Management Specification Version 4.0", The ATM Forum, Apr. 1996.
Ott, Teunis J.; Lakshman, T.V.; Wong, Larry H.; "SRED: Stabilized RED", INFOCOMM '99, Eighteenth Annual Joint Conference of the IEEE Computer and Communications Societies Proceedings, IEEE, Jun. 1999, vol. 3, pp. 1346–1355.
Feng, Wu–Chang; Kandlur, Dilip D.; Saha, Debanjan; Shin, Kang G.; "Blue: A New Class of Active Queue Management Algorithms", U. Michigan CSE–TR–387–99, Apr. 1999.
Feng, Wu–Chang; Kandlur, Dilip D.; Shah, Debanjan; Shin, Kang G.; "Techniques for Eliminating Packet Loss in Congested TCP/IP Networks", U. Michigan CSE–TR–349–97, Nov. 1997.
Srinivasan, V.; Varghese, G.; "Faster IP Lookups using Controlled Prefix Expansion", ACM Transactions on Computer Systems, pp. 1–10, Jun. 1998.
Eatherton, William N.; "ASIC Based IPV4 Lookups", Washington University, Applied Research Laboratory, pp. 1–22, Jun. 23, 1998.
Eatherton, William N.; "Hardware–Based Internet Protocol Prefix Lookups", Thesis, Washington University, pp. 1–100, May 1999.
Srinivasan, V.; Varghese, G.; "Fast Address Lookups Using Controlled Prefix Expansion", ACM Transactions on Computer Systems, vol. 17, No. 1, pp. 1–40, Feb. 1999.
Filippi, E.; Innocenti, V.; Vercellone, V.; "Address Lookup Solutions for Gigabit Switch/Router", Globecom '98, Sydney, Australia, Nov. 1998.
Degermark, Mikael; Brodnik, Andrej; Carlsson, Svante; Pink, Stephen; "Small Forwarding Tables for Fast Routing Lookups", Proc. of ACM SIGCOMM, pp. 3–14, Sep. 1997.
Doeringer, Willibald; Karjoth, Gunter; Nassehi, Medhi; "Routing on Longest–Matching Prefixes", IEEE/ACM Trans. On Networking, vol. 4, No. 1, pp. 86–97, Feb. 1996.
Tzeng, Henry Hong–Yi; Przygienda, Tony; "On Fast Address–Lookup Algorithms"; pp. 1067–1082, IEEE Journal On Selected Areas In Communications, vol. 17, No. 6, Jun. 1999.
Tzeng, Henry Hong–Yi; "Longest Prefix Search Using Compressed Trees", Globecom '98, Sydney, Australia, Nov. 1998.
Kumar, Vijay P.; Lakshman, T.V.; Stiliadis, Dimitrios; Beyond Best Effort: Router Architectures for the Differentiated Services of Tomorrow's Internet, IEEE Communications Magazine, pp. 152–164, May 1998.
Gupta, Pankaj; Lin, Steven; McKeown, Nick; "Routing Lookups in Hardware at Memory Access Speeds", IEEE INFOCOM, Apr. 1998.
Nilsson, Stefan; Karlsson, Gunnar; "Fast Address Lookup for Internet Routers", IFIP Workshop on Broadband Communications, pp. 10–22, Apr. 1998.
Waldvogel, Marcel; Varghese, George; Turner, Jon; Plattner, Bernhard; "Scalable High Speed IP Routing Lookups", Proc. Of ACM SIGCOM, Sep. 1997.
Lampson, B.; Srinivasan, V.; Varghese, G.; "IP Lookups Using Multiway and Multicolumn Search", pp. 1–23, Aug. 1997.
Zitterbart, M.; Harbaum, T.; Meier, D.; Brokelmann, D.; "HeaRT: High Performance Routing Table Look Up", IEEE Workshop Architecture & Implementation of High Performance Communications Subsystems, Thessaloniki, Greece, Jun. 1997.
Fuller, V.; Li, T.; Yu, J.; Varadhan, K.; "Classless Inter–Domain Routing (CIDR): an Address Assignment and Aggregation Strategy", RFC 1519, Internet Engineering Task Force, Sep. 1993.
Pei, Tong Bi; Zukowksi, Charles; "Putting Routing Tables in Silicon", IEEE Network Magazine, pp. 42–50, Jan. 1982.
Morrison, Donald R.; "Patricia—Practical Algorithm To Retrieve Information Coded in Alphanumeric", Journal of the Association for Computing Machinery, pp. 514–534, vol. 15, No. 4, Oct. 1968.
Ghani, Nasir, "Enhanced TCP/IP ACK Pacing for High Speed Networks", Proc. 16th Int'l Teletraffic Congress, Edinburgh, Scotland, Jun., 1999.
Ma, Jian; "Improving TCP Performance in IP networks with Wireless links", IEEE, ICPWC '99, Jaipur, India, pp. 211–215.
Narvaez, Paolo; Siu, Kai–Yeung; "Acknowledgement bucket scheme for regulating TCP flow over ATM", Computer Networks and ISDN Systems, IEEE Globecom '97, Phoenix, Arizona, Nov., 1997 pp. 1775–1791.
Narvaez, Paolo; SIU, Kai–Yeung; "An Acknowledgement Bucket Scheme for Regulating TCP Flow over ATM", IEEE Globecom '97, Phoenix, Arizona, Nov., 1997.

Kioke, Arata; "TCP Flow control with ACR information", ATM Forum Contribution 97–0758R1, Nov., 1997.

Stevens, W.; Memo (IETF RFC 2001): "TCP Slow Start, Congestion Avoidance, Fast Retransmit, and Fast Recovery Algorithms", Jan., 1997.

Karn, P.; "Dropping TCP acks", Mail to the end–to–end mailing list, Feb., 1996.

Astrom, K.; Hagglund T.; "PID Controllers: Theory, Design and Tuning", Instrument Society of America, 1995, pp. v, 80–81.

Ramakrishna, M.V.; Fu, E.; Bahcekapili, E.; "Efficient Hardware Hashing Functions for High Performance Computers", pp. 1378–1381; IEEE Transactions on Computers, vol. 46, No. 12, Dec. 1997.

Jain, Raj; "A Comparison of Hashing Schemes for Address Lookup in Computer Networks"; pp. 1–17; Technical Report DEC–TR–593 Digital Equipment Corporation, Feb. 1989.

McKenney, Paul E.; "High–Speed Event Counting and Classification Using a Dictionary Hash Technique"; pp. III–71–III–75; International Conference on Parallel Processing, 1989.

Carter, Larry; Floyd, Robert; Gill, John; Markowsky, George; Wegman, Mark; "Exact and Approximate Membership Testers", Proc. 10th Annual ACM Symposium on Theory of Computing, pp. 59–65, May 1978.

\* cited by examiner

METHOD AND APPARATUS FOR ADJUSTING PACKET TRANSMISSION VOLUME FROM A SOURCE

BACKGROUND OF THE INVENTION

1. Field of the Invention

The present invention relates to communication over a packet network, and more particularly to adjusting the number of packets which are communicated between a transmitter and a receiver on the network in a time interval to reduce queue congestion.

2. Description of Related Art

With the proliferation of internet and data communications, communication networks are being used to carry an increasing amount of traffic. At the same time, user expectations for network speed and reliability are also increasing.

In a packet network such as the Internet for example, packets of information are conveyed between a packet transmitter and a packet receiver. The transmitter may be any device that transmits data on the network and the receiver may be any device that receives data from the network. Typically, a receiver will send an acknowledgement signal to a transmitter of a packet to indicate that a packet has been received.

Between a transmitter and a receiver, data packets pass through intermediate elements on the network, for example routers, switches and gateways, which receive and queue data packets in queues for transmission on one or more communications channels or links. To avoid overloading any given channel, packet transmission on each channel must be managed and controlled.

One technique for managing traffic on a network is to control the volume of packet transmissions from the transmitters. Typically, a transmitter will have a packet queue and the number of packets which are transmitted from the packet queue in a time interval is determined by a sliding window operating on the packet queue, which prevents the transmitter from transmitting a new packet onto the network whenever more than a specified number of transmitted packets remain unacknowledged by the corresponding receiver. Each time a transmitted packet is acknowledged by the receiver, the window advances, permitting the transmitter to transmit a new packet onto the network. This sliding window is usually called a "congestion window".

The size of the congestion window may be varied by the transmitter, depending on the capacity of the channel and the ability of the receiver to accept packets. These two factors may be measured implicitly by receiving acknowledgement signals at the transmitter. Generally, if acknowledgement signals are received at the transmitter, the volume of packets transmitted in a time interval is increased by increasing the size of the congestion window and if acknowledgement signals are not received or duplicate acknowledgement signals are received, i.e. packet loss is occurring, then the volume of packets transmitted in a time interval is decreased by decreasing the size of the congestion window.

However, the receiver may also explicitly signal to the transmitter its ability to accept packets, for example, by signaling the maximum number of packets it can receive in a time interval. In response, the transmitter will limit the size of its congestion window to avoid transmitting more packets greater than this maximum number. Typically, the receiver encodes this maximum number of packets as an "advertised window" in acknowledgement signals that it sends to the transmitter. The advertised window identifies to the transmitter a maximum value for its congestion window.

The above use of acknowledgement signals is employed by the Transmission Control Protocol (TCP). TCP makes no assumption as to how the network processes the data it sends, and performs its own data recovery and flow control. The TCP flow control mechanism is meant to reduce the packet volume when the network becomes congested, but TCP has no direct way of knowing when the network is congested. It can only indirectly detect congestion by keeping track of how many packets are lost. Packet loss indicates that some queue in the network might have overflowed. Every time TCP detects a packet loss, it reduces the transmission volume to alleviate the congestion that could have caused the packet loss.

In a high-latency network environment, the window flow control mechanism of TCP may not be very effective because it relies on packet loss to signal congestion, instead of preventing congestion and buffer overflow. The basic problem is that TCP does not communicate directly with the network elements to determine optimal or assigned traffic volumes for respective elements. By the time the transmitter starts decreasing its volume because of packet loss, the network has already become overly congested. This problem exists because the design of TCP only considers the flow control needs of the receiver. It does not consider the flow control needs of intermediate hops in the network. Overflow in the network itself would be detected by the sender through timeouts or through acknowledgement arrival patterns. This presents problems in shared multi-hop networks, where the cause of packet loss is within intermediate elements in the network.

Conventional techniques for signaling a source to reduce or adjust its transmission volume are deficient. More specifically, conventional techniques either fail to account for current network conditions, for example the number of active connections, the traffic load per connection, and the bandwidth-delay product per connection, or else do so only by maintaining per-connection state information. Consequently, a conventional advertised window adjustment is either cumbersome to calculate or is less than optimal over a wide range of network conditions. As a result, traffic through an intermediate element may be poorly controlled, causing queues in the intermediate element to be incorrectly allocated and prone to under-utilization or overflow.

SUMMARY OF THE INVENTION

The present invention addresses the above problem by providing a method and apparatus for adjusting the volume of data communicated between a transmitter and a receiver on a network, in a time interval. The method and apparatus involve producing a desired volume value in response to a receiver volume value specified by the receiver and a difference between a target departure volume and an estimate of arrival volume of data at a queue through which data passes from the transmitter to the receiver. The desired volume value is communicated to the transmitter, in response to an acknowledgement signal produced by the receiver.

In accordance with one embodiment of the invention, communicating the desired volume value to the transmitter is implemented by a signal modifier which produces a modified acknowledgement signal including the desired volume value, for communication to the transmitter.

Preferably, producing the desired volume value involves producing a network element volume value and taking the lesser of the receiver volume value extracted from the acknowledgement signal and the network element volume value as the desired volume value.

In one embodiment, computing the network element volume value includes time filtering an arrival volume value, for example as a weighted sum of present and past arrival volumes of data. Desirably, a target departure volume is estimated as a function of a service volume of the queue and a target utilization factor of the queue. The network element volume value is then generated as a function of the difference between the data arrival volume at the queue and the target data departure volume at the queue.

Preferably, there is a queue size control mechanism for controlling the size of the queue. The queue size control mechanism includes a processor circuit for computing a scaling factor to diminish the network element volume value when the number of packets in the queue exceeds a threshold value, in order to decrease the transmission volumes of the transmitters to permit the queue to empty. This enhances the responsiveness and stability of the system and helps to quickly bring the system to desired operating conditions.

Computer readable media, as well as signals embodied in carrier waves including code segments for directing a processor or programmable device to perform the methods described herein are also provided.

Effectively, by communicating a desired volume value to the transmitter, in response to a receiver volume value produced by the receiver and a difference between a target departure volume and an estimate of arrival volume of data at a queue through which data passes from the transmitter to the receiver, the volume of packets communicated by the transmitter continually changes, depending on both the status of the queue and the status of the receiver. Consequently, the volume of packets received at the queue is varied with each time interval. A queue controlled in such a manner is less likely to overflow or be under-utilized. Effectively, the volume of packets which a transmitter communicates through the queue is varied, as required, to urge the packet arrival volume at the queue toward the packet departure volume at the queue. A queue having similar arrival and departure volumes in a given time interval tends toward stability about a desired queue occupancy level, and thus provides higher utilization, predictable delays, more certain buffer provisioning, and load-independent performance. These benefits may be achieved without the need to estimate a number of active network connections to the queue and without collecting or analyzing state information on individual connections. In addition, the methods proposed herein cause the transmitter to react to congestion (in the network and at the destination) before it occurs rather than when it is too late.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention.

DETAILED DESCRIPTION

Figure 1:
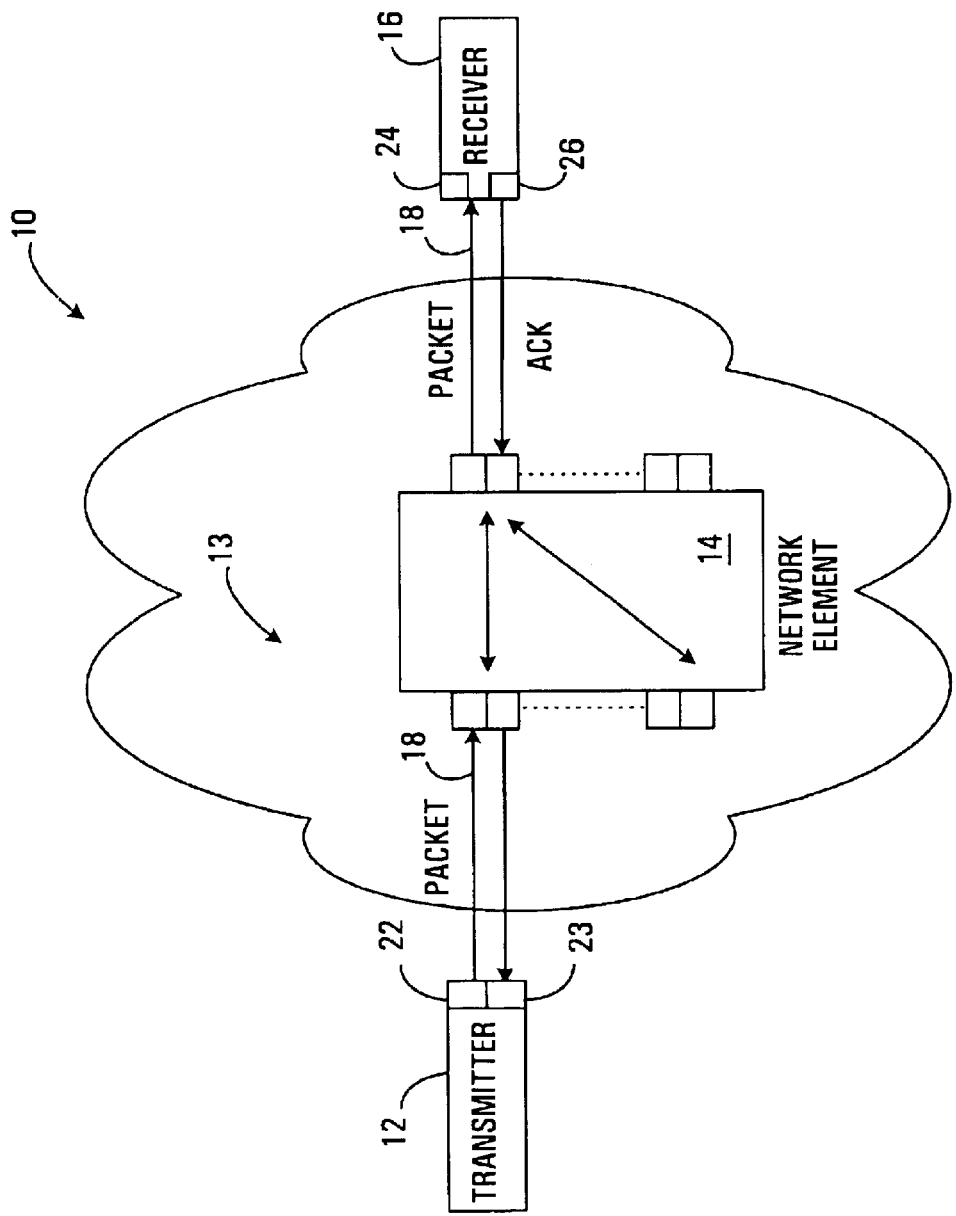
FIG. 1 is a block diagram of a network, including an intermediate network element, according to a first embodiment of the invention.

As shown generally at 10 in FIG. 1, a network according to a first embodiment of the invention includes a first data transmitter 12, a network element 14 and a first data receiver 16. In general, the transmitter 12 transmits data in a forward direction to the network element 14 which, in turn, transmits the data to the receiver 16. It will be appreciated that there may be a plurality of network elements between a plurality of transmitters and a plurality of receivers, however, for simplicity only one of each is shown.

In this embodiment, the data transmitted by the transmitter 12 is transmitted as "forward" packets 18 which are communicated in a forward direction i.e. from the transmitter to the receiver 16. In this specification, the term "packet" is applied broadly, and contemplates any quantum of data, such as a block, a frame, a datagram, a cell, a word, a byte, or a bit, for example. In general, a transmitter 12-receiver 16 pair that exchanges packets via one or more network elements 14 is called a connection.

The first transmitter 12 may be any device capable of transmitting data on a network, for example a telephone, a computer, a terminal, a video camera, an appliance with embedded logic or processor circuitry, or more generally any telecommunication or telephony device. Additionally, the transmitter 12 may include a receiver 23 for receiving data from the network 10.

The receiver 16 may be any device capable of receiving data on a network, for example a telephone, a computer, a terminal, a video receiver, an appliance with embedded logic or processor circuitry, or more generally any telecommunication or telephony device. The receiver 16 includes a receive buffer 24 for receiving packets 18 for use at the receiver 16. Additionally, the receiver 16 has a transmitter 26 for transmitting data on the network 10.

When the receiver 16 receives a forward packet 18, it engages its transmitter to transmit an acknowledgement signal in the form of an acknowledgement packet, in a reverse direction for receipt by the transmitter 12 via the network element 14 associated with the connection. Generally, an acknowledgement signal is a special reverse data packet transmitted in the reverse direction, i.e. from the receiver 16 to the transmitter 12, and includes a specific pattern of bits that identifies it as an acknowledgement signal. This specific pattern of bits includes a representation of a maximum reception volume, which is the maximum volume of data the receiver 16 can receive in a time interval. This maximum volume is referred to as an advertised window of the receiver, or receiver volume value, and has a value of Wrec. Thus, an acknowledgement signal communicates the advertised window, or receiver volume, of the receiver 16 to the transmitter 12.

The transmitter 12 includes a transmission buffer 22 for queuing forward data packets 18 prior to transmission. The volume of forward data packets 18 that is transmitted from the transmission buffer 22 is determined by a siding window called a "congestion window" maintained by a processor at the transmitter and operating on the transmission buffer 22. Each time a transmitted forward data packet 18 is acknowledged the receiver 16, the congestion window advances, permitting the transmitter 12 to transmit a new forward data packet 18 onto the network 10. The size of the congestion window determines the volume of forward data packets 18 transmitted from the transmitter 12.

The transmitter 12 is programmed to adjust the size of its congestion window to be no greater than the size of the advertised window of the receiver 16, or more particularly, to be no greater than the advertised window indicated in the acknowledgement signals it receives. If the transmitter receives an acknowledgement signal directly from the receiver, the receiver 16 can cause the transmitter 12 to increase or decrease its transmission volume according to the capability of the receiver 16 to receive data.

Figure 2:
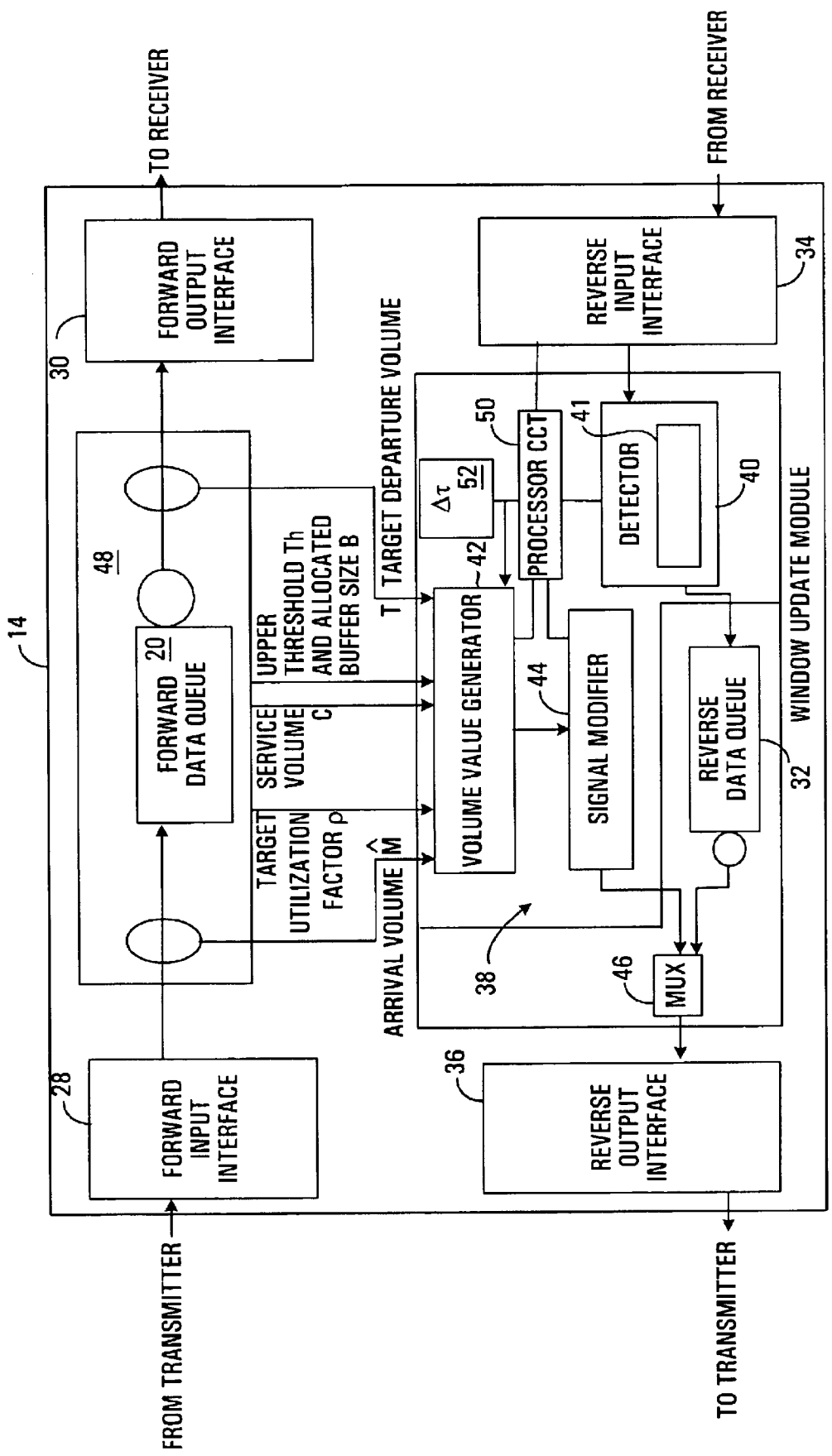
FIG. 2 is a block diagram of the network element shown in FIG. 1.

Referring to FIG. 2, the network element 14 according to the first embodiment of the invention is shown in greater detail and includes an apparatus 38 for adjusting the volume of forward data packets communicated between the transmitter 12 and the receiver 16. To do this, the apparatus 38 includes a detector 40 for detecting an acknowledgement signal produced by the receiver 16 in response to receipt of a forward data packet from the transmitter 12. The apparatus 38 further includes a volume value generator 42 for computing a desired volume value, such as a new advertised window size, and a signal modifier 44 for producing a modified acknowledgement signal including the desired volume value for communication to the transmitter 12.

The apparatus 38 therefore effectively intercepts the acknowledgement signal produced by the receiver 16 and replaces the advertised window size in the acknowledgement signal with a new advertised window size. The apparatus then produces and transmits a new acknowledgement signal with the new advertised window size, to the transmitter 12. The transmitter 12 responds as though the new acknowledgement signal were transmitted directly from the receiver 16, and adjusts the size of its congestion window accordingly.

Referring back to FIG. 1, in the above manner, the transmission volume of the transmitter 12 is adjusted according to network conditions, not just the ability of the receiver to receive data. This eases congestion at the network element 14, thereby improving network performance. Also, changing network conditions as detected by the network element 14 play a role in changing the desired volume and therefore the actual transmission volume of the transmitter 12 is adjusted to take into account the changing capacity of the entire network connection from the transmitter 12 to the receiver 16.

A network element 14, in which the above apparatus may be incorporated could be any device connected to the network 10 to receive forward data packets 18 from a transmitter 12 to be forwarded to a receiver 16 and to receive acknowledgement signals from the receiver 16 to be forwarded to the transmitter 12. In this embodiment, the network element 14 is a store-and forward device, such as a router, switch, or gateway, for example.

Referring to FIG. 2, the network element 14 includes a forward input interface 28 in communication with a communications medium such as a data line, on which the transmitter 12 of FIG. 1 transmits forward data packets. The forward input interface 28 provides data packets to a queue interface 48 which administers packets into a queue 20 and which provides information to the apparatus 38 about the status of the queue 20. Such information could include the total queue capacity Q, the queue occupancy q, the packet arrival volume $\hat{M}$, the target packet departure volume T, the actual service volume C, the target utilization factor ρ, the upper threshold Th, and the allocated buffer size B, for example.

The total queue capacity Q is the total storage space available in the queue 20 for storing packets 18. The queue occupancy q is the number of packets 18 that are currently stored in the queue 20, and may be expressed as a number of packets 18, an amount of memory, or a ratio of the total queue capacity Q. The packet arrival volume $\hat{M}$ represents the number of packets 18 admitted to the queue 20 during a current sampling/control interval Δt. The target packet departure volume T is the target number of packets 18 that can be dispatched from the queue 20 during the current sampling/control interval Δt. The actual service volume C represents the maximum number of packets 18 that can be dispatched from the queue 20 during a sampling/control interval Δt. The target utilization factor ρ represents a desired ratio of the target packet departure volume T and the actual service volume C. The upper threshold Th represents a queue occupancy q above which it is desirable to adjust the arrival volume $\hat{M}$ or the target departure volume T to reduce the queue occupancy q. The allocated buffer size B is the size of an allocated buffer in the queue.

Data packets stored in the queue are provided to a forward output interface 30 which is connected to a communications medium on which the network element 14 transmits forward data packets from the queue 20 to the receiver 16.

Signals received from the receiver 16, in particular, signals representing packets transmitted from the receiver 16 to the transmitter 12 are received from a communications medium by a reverse input interface 34. The reverse input interface 34 converts the received signals into bytes representing a reverse data packet and provides the reverse data packet to the apparatus 38. Specifically, the reverse data packet is received at the detector 40 of the apparatus 38.

Detector

Figure 3:
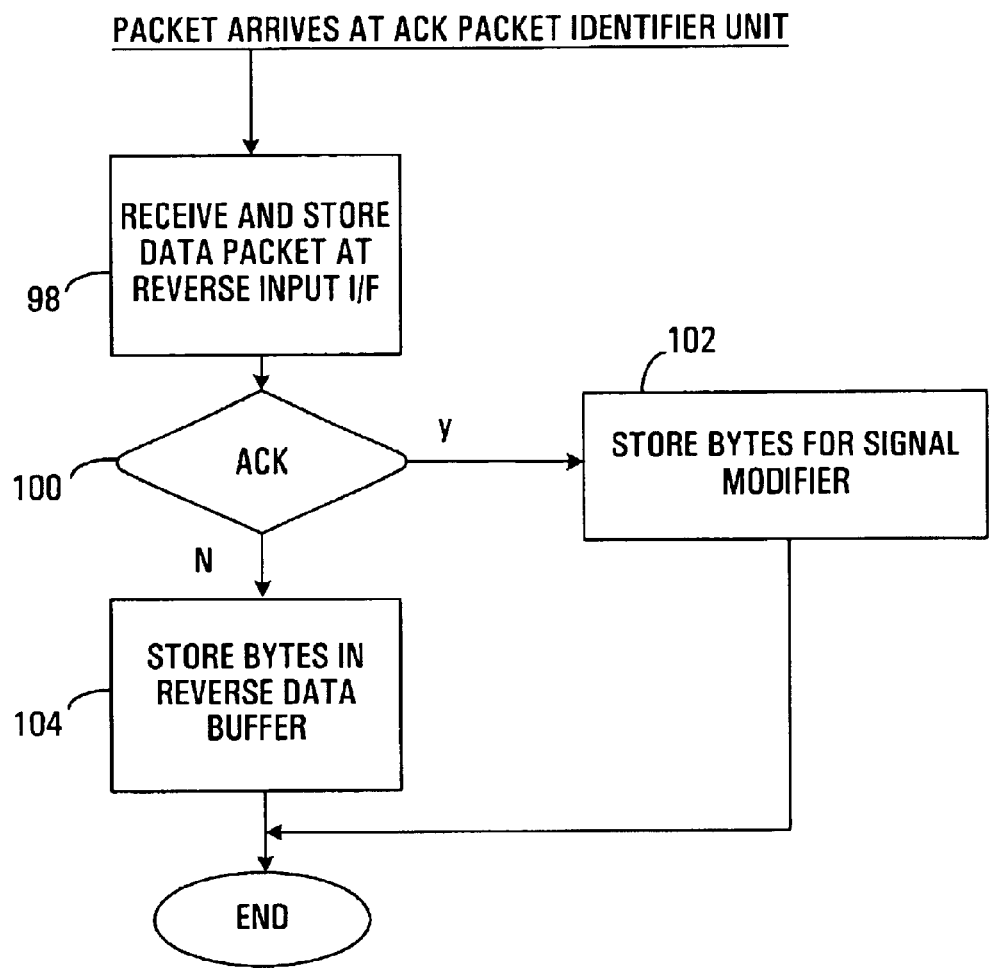
FIG. 3 is a flowchart representing an algorithm executed by a processor at a detector shown in FIG. 2.

The functionality of the detector 40 is explained with reference to FIGS. 2 and 3. The detector 40 receives the reverse data packet and stores it in a buffer 41, as indicated by block 98 in FIG. 3. The detector 40 then examines a type field of the reverse data packet to determine whether or not it is identified as an acknowledgement packet. If the reverse data packet is of the Transmission Control Protocol (TCP) type, the detector simply determines whether or not an "ACK" bit in the TCP packet header is set. Alternatively, acknowledgement information can be obtained from a specially encoded data packet. In any event, as indicated by block 100 in FIG. 3, the detector determines whether or not the reverse data packet represents an acknowledgement from the receiver 16 shown in FIG. 1.

If the reverse data packet does not represent an acknowledgement, then, as indicated by block 104, it is sent out of the apparatus into a reverse data queue 32 which queues data travelling in the reverse direction. Alternatively, as indicated by block 102, if the reverse data packet is identified as representing an acknowledgement, it is forwarded to the signal modifier 44 shown in FIG. 2.

Referring to FIG. 2, the signal modifier 44 modifies, when necessary, the acknowledgement packet to produce a modified acknowledgement packet encoded with a new advertised window to represent the desired volume of data to be transmitted from the transmitter.

A multiplexer 46 receives a signal representing a reverse data packet from the reverse data queue 32 and receives a signal representing the modified acknowledgement packet produced by the signal modifier 44 and selects between them to forward one or the other to a reverse output interface 36. The reverse output interface 36 is connected to a communications medium on which the transmitter is operable to receive data and thereby communicates either the reverse data packet or the modified acknowledgement packet to the transmitter 12.

It will be appreciated that the detector 40 can be implemented by discrete components or in a design involving a processor circuit operable to execute codes for directing the processor to carry out the functionality described above, for example. The functional blocks shown in FIG. 3 may be implemented by such codes, for example. Such codes may be pre-stored at the network element and run by a processor circuit 50 at the network element. It will be appreciated that the processor circuit 50 may be in communication with an interface (not shown) permitting such codes to be downloaded from a remote computer, or the processor circuit may have a media interface (not shown) for reading codes from a computer readable medium such as a CD-ROM, diskette or any other computer readable medium.

Signal Modifier:

The function of the signal modifier 44 is described in connection with FIGS. 2 and 4. To produce the modified acknowledgement packet encoded with the new advertised window, the signal modifier extracts a receiver advertised window, or receiver volume value, from an advertised window field Wrec of the acknowledgement packet as received from the receiver 16 shown in FIG. 1. The terms receiver advertised window, Wrec, and receiver volume are used interchangeably. In addition, the signal modifier receives a network element advertised window Wne, or network element volume value from the volume value generator 42 and determines which of the network element advertised window Wne and the receiver advertised window Wrec is the lesser, subject to some minimum value. The lesser of these two values is encoded and stored in the advertised window field of the acknowledgement packet to replace the current contents thereof. A modified acknowledgement packet is thus produced and forwarded to the multiplexer for transmission to the transmitter. The terms network element advertised window, Wne, and network element volume value are used interchangeably.

It will be appreciated that the signal modifier can be implemented by discrete components or in a design involving a processor circuit operable to execute codes for directing the processor circuit to carry out the functionality described above, for example. Such a processor circuit may be the same processor circuit 50 as used for the detector 40 or may be a separate processor circuit. It will be appreciated that the processor circuit may be in communication with an interface (not shown) permitting such codes to be downloaded from a remote computer, or the processor circuit may have a media interface for reading codes from a computer readable medium such as a CD-ROM, diskette or any other computer readable medium.

Figure 4:
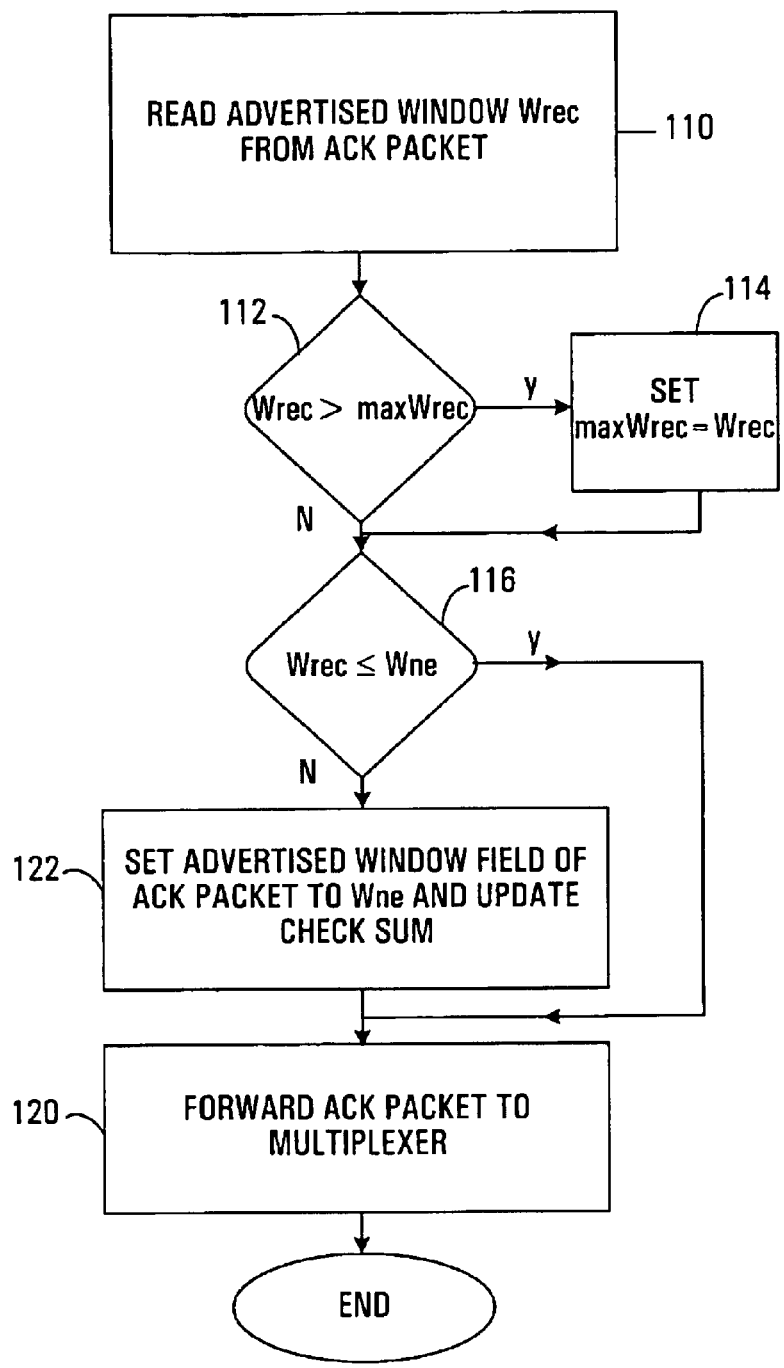
FIG. 4 is a flowchart representing an algorithm executed by a processor at a signal modifier shown in FIG. 2.

Codes which direct a processor circuit to carry out the functionality described above are represented by blocks in the flowchart shown in FIG. 4. In this flowchart, Block 110 directs the processor circuit 50 to extract an advertised window Wrec from the acknowledgement packet.

Block 112 directs the processor circuit 50 to determine whether the receiver advertised window Wrec is greater than a previously obtained maximum advertised window value max Wrec. If so, then block 114 directs the processor circuit to set the maximum receiver advertised window value max Wrec equal to the currently observed receiver advertised window Wrec. Over time this has the effect of finding and storing as the maxWrec value, the maximum observed receiver advertised window Wrec. Thereafter, block 114 directs the processor circuit to block 116.

Alternatively, if the receiver advertized window Wrec is not greater than the maximum receiver advertised window max Wrec, then the processor circuit 50 is directed to block 116, where it is directed to determine whether the receiver advertized window value Wrec is less than or equal to the current advertised window of the network element Wne. If so, then block 120 directs the processor circuit to forward the acknowledgement packet to the multiplexer 46 shown in FIG. 2, without modification, for transmission to the transmitter 12 shown in FIG. 1.

Referring back to FIG. 4, alternatively, if the receiver advertised window Wrec of the receiver is not less than the current advertised window Wne of the network element, then the processor circuit 50 is directed by block 122 to modify the advertised window field of the acknowledgement packet to include a representation of the current advertized window Wne of the network element and to modify a checksum field of the acknowledgement packet accordingly, to produce a modified acknowledgement packet. Thereafter, block 120 directs the processor circuit to forward the modified acknowledgement packet to the multiplexer 46, which forwards it to the reverse output interface 36 for transmission to the transmitter 12.

Volume Value Generator:

The network element advertised window Wne is calculated by the volume value generator 42 shown in FIG. 2 in response to conditions at the queue 20 through which the forward data packets pass from the transmitter to the receiver. Effectively, the network element advertised window size is estimated as a function of conditions including the mismatch between the forward data arrival volume and the target or desired forward data departure volume of the queue, upper and lower bound departure volumes, the target utilization factor, the actual service volume, the queue occupancy and the allocated buffer size, for example.

To achieve this functionality, the volume value generator 42 may be implemented in a design involving a processor circuit operable to execute codes for directing the processor to carry out the functionality of the volume value generator, for example. Such codes may be pre-stored at the network element 14 and run by a processor at the network element, including the processor circuit 50, for example. It will be appreciated that the processor circuit may be in communication with an interface (not shown) permitting such codes to be downloaded from a remote computer, or the processor circuit may have a media interface for reading codes from a computer readable medium such as a CD-ROM, diskette or any other computer readable medium.

Referring to FIG. 2, whether the volume value generator 42 is implemented by the processor circuit 50 or discretely, it includes an interval timer 52 that periodically decrements from a value representing the sampling/control interval $\Delta t$. The expiration of the timer 52 marks the beginning of a new time-interval n, whereupon the interval timer 52 is reset to again begin decrementing the sampling/control-interval $\Delta t$.

Preferably the sampling/control interval $\Delta t$ is at least equal to the maximum possible round trip time (RTT). A suitable default RTT for a Wide Area Network (WAN) is 100 mSec.

Figure 5:
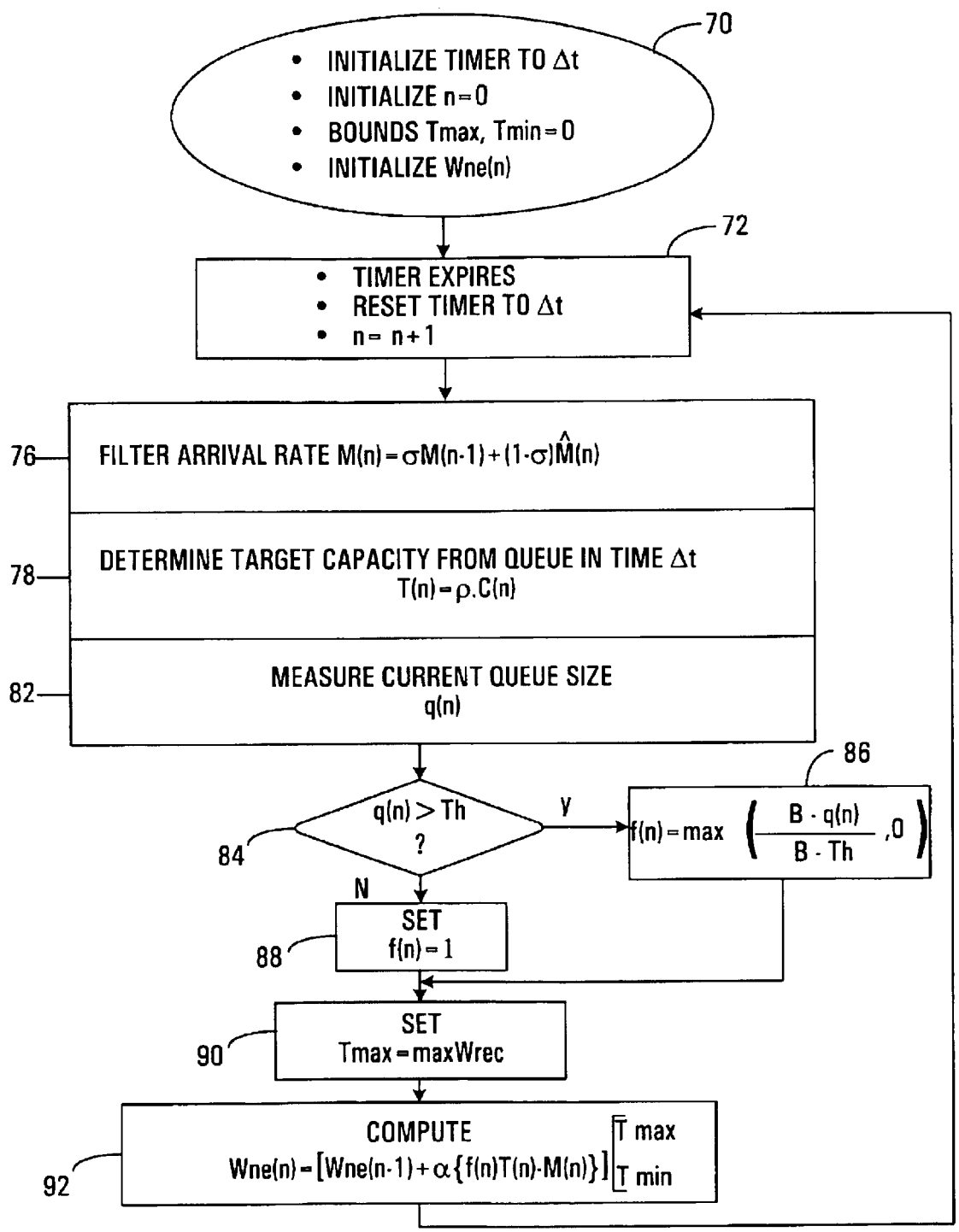
FIG. 5 is a flowchart representing an algorithm executed by a processor at a generator shown in FIG. 2.

Referring to FIG. 5, the operation of the volume value generator 42 is described by way of a flowchart of an algorithm illustrating how a network element volume value is computed by the volume value generator. The flowchart shown may be considered to represent blocks of codes for directing a processor circuit to provide the functionality of the volume value generator.

Referring to FIGS. 2 and 5, at block 70, the process of computing a network element volume value begins with an initialization block to direct the processor circuit 50 to initialize the timer 52 to the sampling/control-interval value Δt, to initialize a sample index n to 0, to initialize an upper and lower bound departure volumes T max, T min equal to 0, and to initialize the network element volume value Wne(n=0) to a suitable value such as a known bandwidth-delay product of a typical connection. In general, the computed network element volume value will converge to an optimal value after a few iterations of the algorithm regardless of what initial network element volume value is used.

The timer 52 periodically decrements from the sampling/control-interval value Δt, and when it expires, block 72 is invoked, for example through an interrupt signal produced by the timer 52. Block 72 directs the processor circuit 50 to reset the interval timer 52 with the sampling/control-interval value Δt and to increment the sample index n, i.e. n=n+1, causing an advance to the next sampling/control interval. Thus, the timer 52 marks sampling/control intervals of duration Δt.

Block 76 directs the processor circuit 50 to act as a current arrival volume filter to obtain a new current arrival volume estimate $\hat{M}(n)$ from the queue interface 48 and to time filter the current arrival volume $\hat{M}(n)$ as a weighted sum of present and past arrival volumes, in this embodiment according to the equation $M(n)=\Theta \hat{M}(n-1)+(1-\Theta)\hat{M}(n)$, where Θ is a weighting constant between 0 and 1, pre-programmable by a user to produce a filtered current arrival volume estimate. The use of the current arrival volume filter reduces the effect of sudden bursts of data such as those transmitted according to TCP, on the filtered arrival volume estimate.

Block 78 then directs the processor circuit 50 to act as a departure volume value generator by obtaining the target utilization factor ρ and the actual service volume C from the queue interface 48 and by producing a calculated current target departure volume T(n), as the product of the target utilization factor ρ (e.g. 95%), and the actual service volume C. The current target departure volume represents the target number of bytes that can be transmitted from the queue in a time interval Δt.

Blocks 82 to 88 direct the processor circuit 50 to act as a queue size control mechanism. Block 82 directs the processor circuit to obtain the current queue occupancy q(n) and the upper threshold Th from the queue interface 48 and block 84 directs the processor circuit to determine whether the current queue occupancy q(n) is greater than the upper threshold Th.

If the current queue occupancy q(n) is greater, then block 86 directs the processor circuit 50 to obtain the allocated buffer size B from the queue interface 48 and to set a scaling factor f(n) in this embodiment according to the equation $$f(n) = \max\left(\frac{B - q(n)}{B - T_h}, 0\right).$$

The processor circuit is then directed to block 90. Alternatively, if at block 84 the current queue occupancy q(n) is less than or equal to the maximum threshold Th, then block 88 directs the processor circuit to set the scaling factor f(n) equal to 1 and to proceed to block 90.

Optionally the algorithm may include block 90 which directs the processor circuit 50 to act as a volume limiter by setting the maximum departure volume T max equal to the maximum observed receiver volume value max Wrec, where the maximum observed receiver volume value is obtained from the signal modifier 44 shown in FIG. 2.

Block 92 then directs the processor circuit 50 to set the current network element volume value Wne(n) equal to a function of the previous network element volume, plus the product of a control gain a and the difference between the product of the scaling factor f(n) and the calculated target departure volume T(n), less the arrival volume M(n), all bounded between the maximum departure volume T max and the minimum departure volume T min:

$$Wne(n)=[Wne(n-1)+\alpha\{f(n)T(n)-M(n)\}]_{T\ min}^{T\ max}, 0<\alpha<1.$$

A minimum (positive) window is preferably T min=0 however a larger minimum window may alternatively be used.

Referring back to FIG. 2, the calculated network element volume value Wne is then provided by the volume value generator 42 to the signal modifier 44 for use as described above in connection with the signal modifier 44.

Thus, it will be appreciated that the apparatus 38 cooperates to provide a modified acknowledgement packet encoded with a new advertised window which specifies a desired volume at which the network element should ideally receive data from the transmitter to avoid queue congestion.

Figure 6:
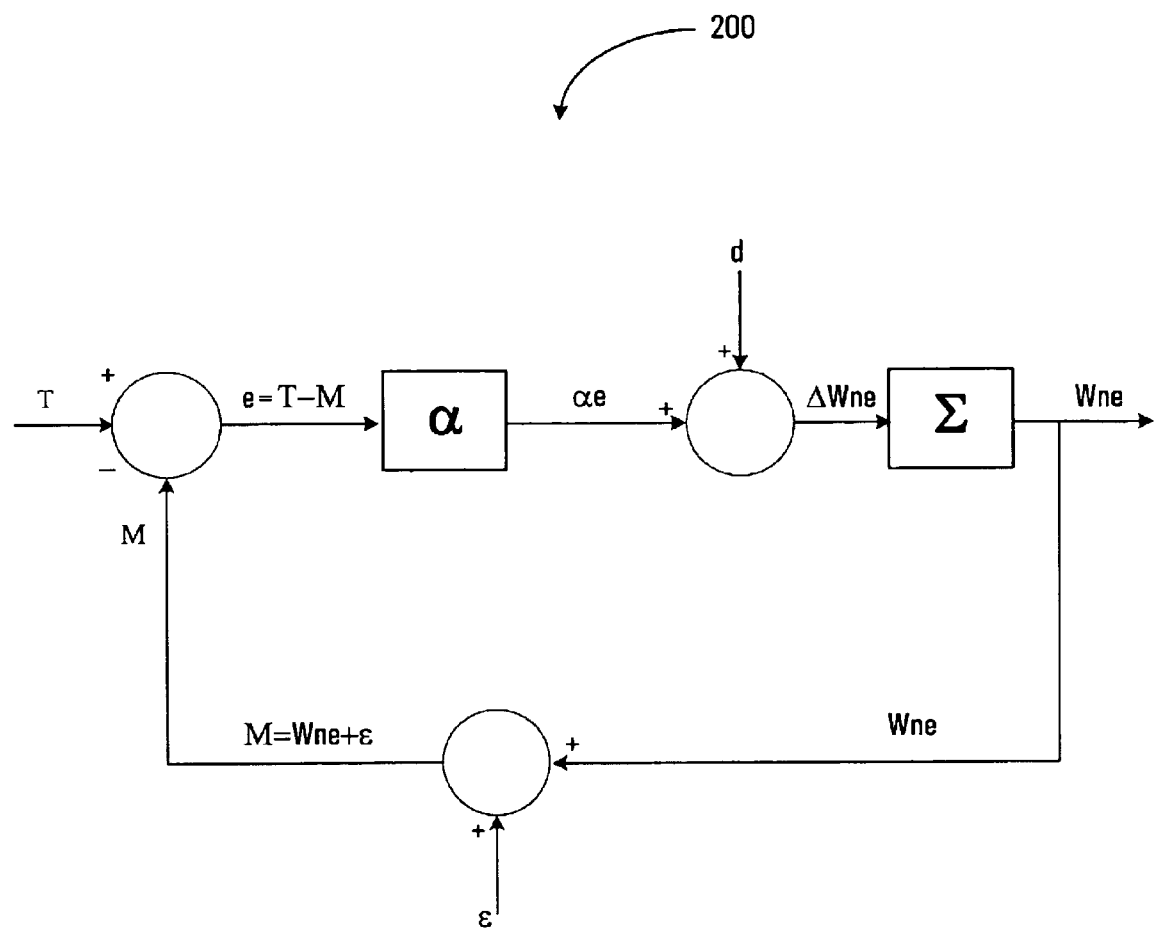
FIG. 6 is a block diagram representing the control process for computing a new network element volume of FIG. 1.

It should be noted that the queue size control mechanism is triggered when the number of packets q(n) in the queue 20 exceeds a queue threshold Th. When this happens, the target capacity T(n) (i.e., the target number of bytes that can be transmitted by the transmitter 12 over the sampling period) is scaled down by a factor f(q(n)), with the capacity (1−f(q(n)))T(n) used to drain the queue. As soon as the overload condition disappears, the queue size control mechanism is disabled and window size computation is determined based on the unscaled target capacity T(n). An example of the function f(q(n)) is:

when Th<q(n)≤B then $f(n)=e^{-\xi(q(n)-Th)}$ when q(n)−Th≤0 then f(n)=1 where:
  ξ=a decay factor of the queue control function
  B=allocated buffer size
  q(n)=instantaneous queue size
  Th=queue threshold value Referring to FIG. 6, a discrete time representation of the control process for producing a new network element volume is shown generally at 200.

In the embodiment shown the apparatus 38 shown in FIG. 2 modifies the returning acknowledgements (e.g. ACKs) in a traffic class, regardless of the connections they belong to. That is, all connections in a traffic class (queue) are treated equally and receive the same feedback for the same network condition. This results in a simple control design and avoids the need to maintain the state of active TCP connections in the router. In the case of a connection not making use of its allocated window, there will be a mismatch (or error) between the arrival volume M(n) and the target departure volume T(n), causing an increase in the network element window Wne being signalled to all connections. This results in the active connections increasing their window sizes (thus their throughput), sharing the available bandwidth equally.

Considering all external disturbances d(n) to the control process, the control equation can be written as $$Wne(n+1) = Wne(n) + \alpha[T(n) - M(n)] + d(n)$$
$$= Wne(n) + \alpha[T(n) - Wne(n) - \varepsilon(n)] + d(n)$$
$$= (1 - \alpha)Wne(n) + \alpha T(n) - \alpha\varepsilon(n) + d(n).$$

To focus on the effects of the error term $\epsilon(n)$ and the disturbance term d(n), T(n) can be set to 0. This can be done without loss of generality, resulting in:

$$Wne(n+1) - (1-\alpha)Wne(n) = -\alpha\epsilon(n) + d(n)$$

which has the solution given by:

$$Wne(n) = Wne(0)(1-\alpha)^n + \sum_{i=0}^{n-1}[d(i) - \alpha\varepsilon(i)](1-\alpha)^{n-1-i}$$

For further simplification, it can be assumed that Wne(0)=0 which gives the following equation:

$$Wne(n) = \sum_{i=0}^{n-1}[d(i) - \alpha\varepsilon(i)](1-\alpha)^{n-1-i},$$

or $$Wne(n) = \sum_{i=0}^{n-1}[d(n-i-1) - \alpha\varepsilon(n-i-1)](1-\alpha)^i.$$

Thus, if the effects of noise and disturbances are to be eliminated as n increases without bound, the coefficients of each $[d(i) - \alpha\epsilon(i)]$ must decrease in magnitude with increasing n. For this to occur:

$$|1-\alpha| < 1,$$

or $$0 < \alpha < 2.$$

The limit $0<\alpha<2$ is a theoretical stability bound. In practice, the $\alpha$ depends not only on the physical properties of the system itself but also on the environment in which the system must operate. The "best" value for a depends primarily on the characteristics of the system's noise, perturbations and process delays. In cases where these quantities are completely known, theoretically optional values of a can be determined. However, these quantities are usually unknown in practical systems such as IP networks.

Delays of various sorts are very common in systems including the system described above. The most common sources of delay are in obtaining the output to be observed, in performing measurements, in feeding measured values to the controller, and in implementing control action. The first of these sources is often due to what is called "transportation lag". It has been observed that system noise, perturbations, and delays can cause severe limitations in system performance, especially stability, thus requiring $\alpha$ to be much smaller than 2 (i.e., $\alpha <<2$) for the system to be stable. In addition, because of the peculiar behaviour of TCP (i.e., slow-start, congestion avoidance, timeouts, etc.), it is very difficult to design a completely "rapid-response controller" in which the entire control action is effectively completed within the sampling period $\Delta t$. Consequently, the practical stability limit is much more constrained than $0<\alpha<2$.

A queue size control mechanism is used in the algorithm to help regulate the queue occupancy level. This mechanism is triggered when the network queue operates at or beyond a knee of the delay-throughput curve (where the queue size can become large). The mechanism improves responsiveness (especially when many TCP connections enter or leave the system) and controls the queue length (thereby minimizing packet losses and network delays). The queue size control mechanism enhances the responsiveness and stability of the system and helps to quickly bring the system to the desired operating conditions.

A benefit of the transmission volume adjustment scheme described herein is that the sum of the windows of the active connections sharing a buffer or queue in a network element such as a router is matched to the effective network bandwidth-delay product, thus avoiding packet losses whenever possible. This is achieved by explicitly controlling the data volume on the connections as a function of prevailing conditions in the network element. The data volume information is communicated by the router to the transmitters by modifying the advertised window field in the acknowledgements or ACKs flowing back to them. The proposed scheme does not require modifications to the TCP implementations in the end systems, and does not need to maintain per-flow state in the router. The scheme is able to provide high throughput, fairness, and low packet loss rates to the TCP connections.

While specific embodiments of the invention have been described and illustrated, such embodiments should be considered illustrative of the invention only and not as limiting the invention as construed in accordance with the accompanying claims.

What is claimed is:

1. A method of adjusting the volume of data communicated between a transmitter and a receiver on a network in a time interval, the method comprising:
   a) producing a desired volume value in response to a receiver volume value specified by the receiver and a difference between a target departure volume and an estimate of arrival volume of data at a queue through which data passes from the transmitter to the receiver, wherein said target departure volume is a desired departure volume; and
   b) communicating said desired volume value to the transmitter in response to an acknowledgement signal produced by the receiver.

2. The method claimed in claim 1 further comprising detecting an acknowledgement signal produced by the receiver in response to receipt of a data packet at the receiver.

3. The method claimed in claim 2 wherein communicating said desired volume value to the transmitter comprises:
   a) generating a network element volume value; and
   b) communicating at least one of said receiver volume value and said network element volume value to the transmitter.

4. The method claimed in claim 3 further comprising extracting said receiver volume value from said acknowledgement signal.

5. The method claimed in claim 4 wherein producing said desired volume value further comprises extracting a plurality of receiver volume values from a plurality of acknowledgement signals.

6. The method claimed in claim 5 wherein producing said desired volume value comprises setting as said receiver volume value a maximum receiver volume value of said plurality of receiver volume values.

7. The method claimed in claim 4 wherein communicating said desired volume value to the transmitter comprises communicating the lesser of said receiver volume value and said network element volume value to the transmitter.

8. The method claimed in claim 7 wherein communicating further comprises producing a modified acknowledgement packet including said lesser of said receiver volume value and said network element volume value and communicating said modified acknowledgement packet to said transmitter.

9. The method claimed in claim 3 wherein generating said network element volume comprises time filtering successive arrival volume values to produce a filtered arrival volume value.

10. The method claimed in claim 9 wherein time filtering comprises producing a weighted sum of present and past arrival volume values.

11. The method claimed in claim 10 wherein generating said network element volume value comprises generating an estimated target data packet departure volume in response to a service volume of the queue and a target utilization factor of the queue.

12. The method claimed in claim 11 wherein generating said network element volume value comprises controlling a size of the queue.

13. The method claimed in claim 12 wherein controlling the size of the queue comprises producing a scaling factor in response to whether queue occupancy is greater than a threshold value.

14. The method claimed in claim 13 wherein generating said network element volume value comprises generating said network element volume value as a function of a previous network element volume value, a control gain, said scaling factor, a target departure volume of data leaving the queue and said filtered arrival volume value.

15. The method claimed in claim 3 wherein generating said network element volume value comprises bounding said network element volume value between a maximum value and a minimum value.

16. A computer readable medium for providing codes for directing a processor to:
a) produce a desired volume value at which packets are communicated between a transmitter and a receiver on a network, in response to a receiver volume value specified by the receiver and a difference between a target departure volume and an estimate of arrival volume of data at a queue through which data passes from the transmitter to the receiver, wherein said target departure volume is a desired departure volume; and
b) communicate said desired volume value to the transmitter in response to an acknowledgement signal produced by the receiver.

17. A signal encoded with code segments for directing a processor to adjust a volume at which packets are communicated between a transmitter and a receiver on a network, the signal comprising:
a) a first code segment for directing said processor to produce a desired volume value in response to a receiver volume value specified by the receiver and a difference between a target departure volume and an estimate of arrival volume of data at a queue through which data passes from the transmitter to the receiver, wherein said target departure volume is a desired departure volume; and
b) a second code segment for directing said processor to communicate said desired volume value to the transmitter in response to an acknowledgement signal produced by the receiver.

18. An apparatus for adjusting the volume of data communicated between a transmitter and a receiver on a network in a time interval, the apparatus comprising:
a) means for producing a desired volume value in response to a receiver volume specified by the receiver and a difference between a target departure volume and an estimate of arrival volume of data at a queue through which data passes from the transmitter to the receiver, wherein said target departure volume is a desired departure volume; and
b) means for communicating said desired volume value to the transmitter in response to an acknowledgement signal produced by the receiver.

19. An apparatus for adjusting the volume of data communicated between a transmitter and a receiver through a queue on a network in a time interval, the apparatus comprising:
a) a detector for detecting an acknowledgement signal produced by the receiver in response to receipt of a data packet at the receiver, wherein said target departure volume is a desired departure volume;
b) a volume value generator for computing a network element volume value in response to a receiver volume value specified by said acknowledgement signal and a difference between a target departure volume and an estimate of arrival volume of data at a queue through which data passes from the transmitter to the receiver; and
c) a signal modifier for producing a modified acknowledgement signal including a desired volume value for communication to the transmitter, in response to said network element volume value and a receiver volume value identified in said acknowledgement signal.

20. The apparatus claimed in claim 19 wherein said detector is operable to receive a data packet from the receiver.

21. The apparatus claimed in claim 20 wherein said signal modifier communicates to the transmitter at least one of said receiver volume value and said network element volume value as said desired volume value.

22. The apparatus claimed in claim 21 wherein said signal modifier extracts said receiver volume value from said acknowledgement signal.

23. The apparatus claimed in claim 22 wherein said signal modifier extracts a plurality of receiver volume values from a plurality of acknowledgement signals and selects as said receiver volume value a maximum receiver volume value of said plurality of receiver volume values.

24. The apparatus claimed in claim 23 wherein said signal modifier communicates to the transmitter the lesser of said receiver volume value and said network element volume value, as said desired volume value.

25. The apparatus claimed in claim 19 wherein said volume value generator comprises a fitter for time filtering successive date arrival volume values to produce a filtered data arrival volume value.

26. The apparatus claimed in claim 25 wherein said filter is operable to produce a weighted sum of present and past arrival volume values.

27. The apparatus claimed in claim 19 wherein said volume value generator comprises a departure volume value generator for generating an estimated target data packet departure volume value in response to an actual service volume value of the queue and a target utilization factor of the queue.

28. The apparatus claimed in claim 19 wherein said volume value generator further comprises a queue size control mechanism for controlling the size of the queue.

29. The apparatus claimed in claim 28 wherein said queue size control mechanism comprises a processor circuit for computing a scaling factor to diminish said network element volume value when the number of packets in the queue exceeds a threshold value.

30. The apparatus claimed in claim 19 wherein said volume value generator generates said network element volume as a function of a previous network element volume value, a control gain, a scaling factor, a departure volume of data leaving the queue and a filtered arrival volume value.

31. A method of adjusting the volume of data communicated between a transmitter and a receiver on a network in a time interval, the method comprising:

producing a desired volume value in response to a receiver volume value specified by the receiver and a difference between a target departure volume and an estimate of arrival volume of data at a queue through which data passes from the transmitter to the receiver;

generating a network element volume value by:

time filtering successive arrival volume values to produce a filtered arrival volume value as a weighted sum of present and past arrival volume values; and generating a target data packet departure volume in response to a service volume of the queue and a target utilization factor of the queue;

controlling a size of the queue by producing a scaling factor in response to whether queue occupancy is greater than a threshold value, to generate said network element volume value as a function of a previous desired volume value, a control gain, said scaling factor, a target departure volume of data leaving the queue and said filtered arrival volume value;

detecting an acknowledgement signal produced by the receiver in response to receipt of a data packet at the receiver; and communicating at least one of said receiver volume value and said network element volume value to the transmitter, as said desired volume value in response to said acknowledgement signal.

32. An apparatus for adjusting the volume of data communicated between a transmitter and a receiver through a queue on a network in a time interval, the apparatus comprising:

a) a detector for detecting an acknowledgement signal produced by the receiver in response to receipt of a data packet at the receiver;

b) a volume value generator for computing a network element volume value in response to a receiver volume value specified by said acknowledgement signal and a difference between a target departure volume and an estimate of arrival volume of data at a queue through which data passes from the transmitter to the receiver as a function of a previous network element volume value, a control gain, a scaling factor, a departure volume of data leaving the queue and a filtered arrival volume value; and c) a signal modifier for producing a modified acknowledgement signal including a desired volume value for communication to the transmitter, in response to said network element volume value and a receiver volume value identified in said acknowledgement signal.

33. A method of adjusting the volume of data communicated between a transmitter and a receiver on a network in a time interval, the network having elements receiving data and acknowledgement packets and having a plurality of transmitter and receiver connections, the method comprising:

a) determining at a network element, a current error value based at least in part on an aggregate volume of data packets received from the plurality of transmitter connections and a desired volume of data packets;

b) generating a new desired volume value as a function of a previous desired volume value, a control gain, a scaling factor, and said current error value; and c) communicating said new desired volume value to the transmitter associated with said transmitter connections in response to an acknowledgement signal received from a receiver.

* * * * *